United States Patent
Jeong

(10) Patent No.: US 10,112,343 B2
(45) Date of Patent: Oct. 30, 2018

(54) ROBOT SYSTEM AND 3D PRINTER INCLUDING THE SAME

(71) Applicant: LG ELECTRONICS INC., Seoul (KR)

(72) Inventor: Haiseong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 14/945,237

(22) Filed: Nov. 18, 2015

(65) Prior Publication Data

US 2016/0136886 A1   May 19, 2016

(30) Foreign Application Priority Data

Nov. 19, 2014   (KR) .................. 10-2014-0161775

(51) Int. Cl.
   *B29C 67/00*   (2017.01)
   *B25J 9/10*   (2006.01)
   (Continued)

(52) U.S. Cl.
   CPC .......... *B29C 67/0055* (2013.01); *B25J 9/023* (2013.01); *B25J 9/104* (2013.01); *B29C 64/106* (2017.08);
   (Continued)

(58) Field of Classification Search
   CPC ....... B25J 9/126; Y10S 901/16; Y10S 901/21; Y10S 901/23; Y10S 901/24;
   (Continued)

(56) References Cited

U.S. PATENT DOCUMENTS 5,265,490 A * 11/1993 Azuma ................. B25J 9/041
                                                  74/490.04
6,722,872 B1 * 4/2004 Swanson ................ B29C 41/36
                                                  425/225
(Continued)

FOREIGN PATENT DOCUMENTS

JP    H05-104462       4/1993
JP    H06-003579 U     1/1994
(Continued)

OTHER PUBLICATIONS

International Search Report dated Mar. 2, 2016 issued in Application No. PCT/KR2015/012427.

*Primary Examiner* — Matthew J Daniels
*Assistant Examiner* — Lawrence D. Hohenbrink, Jr.
(74) *Attorney, Agent, or Firm* — Ked & Associates, LLP

(57) ABSTRACT

A robot system including a first motor capable of normal and reverse rotation, a second motor capable of normal and reverse rotation and spaced apart from the first motor, pulleys coupled to rotating shafts of the first and second motors, respectively, a frame, a moving arm including a mount slidably mounted on the frame and including a free end positioned opposite the mount in a longitudinal direction, a carriage mounted on the moving arm such that the carriage is slidable in a direction perpendicular to a slide direction of the moving arm, a belt wrapped around the pulleys and connected to the carriage, and a plurality of idlers for guiding the belt. It is possible not only to control a position of the carriage by resultant force of the first and second motors but also to precisely control the carriage by the simply structured moving arm having the free end.

15 Claims, 14 Drawing Sheets

(51) Int. Cl.
  *B25J 9/02* (2006.01)
  *B29C 64/106* (2017.01)
  *B29C 64/20* (2017.01)
  *B33Y 30/00* (2015.01)
  *B33Y 40/00* (2015.01)
  *B29C 64/379* (2017.01)
  *B29C 64/232* (2017.01)
  *B29C 64/236* (2017.01)

(52) U.S. Cl.
  CPC ............ *B29C 64/20* (2017.08); *B29C 64/232* (2017.08); *B29C 64/236* (2017.08); *B29C 64/379* (2017.08); *B33Y 30/00* (2014.12); *B33Y 40/00* (2014.12); *Y10S 901/21* (2013.01)

(58) Field of Classification Search
  CPC ............ B29C 67/0055; B29C 67/0085; B29C 64/232; B29C 64/236; B29C 64/379; B33Y 30/00; B33Y 40/00
  USPC ............... 74/490.03; 901/21; 425/174.4, 375
  See application file for complete search history.

(56) References Cited

U.S. PATENT DOCUMENTS

| | | | |
|---|---|---|---|
| 9,216,544 B2* | 12/2015 | Swanson | B29C 67/0059 |
| 2013/0078073 A1* | 3/2013 | Comb | F16H 19/06 |
| | | | 414/749.1 |
| 2015/0108687 A1* | 4/2015 | Snyder | B29C 64/106 |
| | | | 264/308 |
| 2016/0046081 A1* | 2/2016 | Kim | B29C 47/0014 |
| | | | 425/143 |
| 2016/0193785 A1* | 7/2016 | Bell | B33Y 10/00 |
| | | | 264/255 |

FOREIGN PATENT DOCUMENTS

| | | |
|---|---|---|
| JP | H06-226660 | 8/1994 |
| KR | 10-2002-0086066 | 11/2002 |
| KR | 10-1346704 | 12/2013 |

* cited by examiner

ROBOT SYSTEM AND 3D PRINTER INCLUDING THE SAME

CROSS-REFERENCE TO RELATED APPLICATION

This application claims the priority benefit of Korean Patent Application No. 10-2014-0161775, filed on Nov. 19, 2014 in the Korean Intellectual Property Office, the disclosure of which is incorporated herein by reference.

BACKGROUND OF THE INVENTION

1. Field of the invention

The present invention relates to a robot system and a three-dimensional printer including the same, and more particularly to a robot system including a single moving arm and a three-dimensional printer including the same.

2. Description of the Related Art

A robot is a machine capable of performing tasks in place of a human worker, and is also a mechanical structure capable of performing mechanical movement.

The robot may be applied to various kinds of machinery such as medical machines, metal cutting machines and forming machines.

The robot may include a driving source such as a motor, and at least one moving member driven by the driving source.

When the robot is applied to a machine for forming a three-dimensional object, such as a three-dimensional printer, the robot is preferably operated a precisely and smoothly as possible for production of high-grade three-dimensional objects.

SUMMARY OF THE INVENTION

It is an object of the present invention to provide a robot system which is precisely controllable by a simple structure.

It is another object of the present invention to provide a three-dimensional printer including a robot system, which is capable of precisely forming a three-dimensional object.

In accordance with an aspect of the present invention, the above and other objects can be accomplished by the provision of a robot system including a first motor capable of normal and reverse rotation, a second motor capable of normal and reverse rotation and spaced apart from the first motor, pulleys coupled to rotating shafts of the first and second motors, respectively, a frame, a moving arm including a mount slidably mounted on the frame and including a free end positioned opposite the mount in a longitudinal direction, a carriage mounted on the moving arm such that the carriage is slidable in a direction perpendicular to a slide direction of the moving arm, a belt wrapped around the pulleys and connected to the carriage, and a plurality of idlers for guiding the belt.

The plurality of idlers may include a pair of first idlers installed at the mount so as to turn the belt perpendicularly, a pair of second idlers installed at the mount to be spaced apart from the pair of first idlers so as to turn the belt perpendicularly, a pair of third idlers installed at a position on the moving arm opposite the pair of first idlers so as to turn the belt in the opposite direction, and a fourth idler installed at the carriage so as to turn the belt in the opposite direction.

The belt may be connected at one end thereof to the carriage and may be wrapped around the pair of third idlers, the pair of second idlers, one of the pulleys, the pair of first idlers and the fourth idler in this order.

A width between the pair of second idlers may be greater than that of the pair of first idlers.

The pair of second idlers may be closer to the carriage than the pair of first idlers.

The fourth idler may be disposed to face an area between the pair of first idlers.

The carriage may include an idler installation portion to which the fourth idler is rotatably coupled.

The carriage may include a belt connecting portion to which both ends of the belt are connected.

The first and second motors may be concurrently operated, or one of the first and second motors may be operated while the other is stopped.

The rotating shafts of the first and second motors may rotate in directions opposite to each other to advance or retreat the carriage.

The rotating shafts of the first and second motors may rotate in the same direction to advance or retreat the carriage.

When one of the first and second motors is operated while the other is stopped, the moving arm and the carriage may linearly move to move the carriage in an inclined direction.

In accordance with another aspect of the present invention, the above and other objects can be accomplished by the provision of a three-dimensional printer including a robot system, including a case including a cavity defined therein, an extruder including a heating part for heating a filament and a nozzle for discharging the filament heated and melted in the heating part, and a robot system disposed in the case, wherein the robot system includes a first motor capable of normal and reverse rotation, a second motor capable of normal and reverse rotation and spaced apart from the first motor, pulleys coupled to rotating shafts of the first and second motors, respectively, a frame, a moving arm including a mount slidably mounted on the frame and including a free end positioned opposite the mount in a longitudinal direction, a carriage mounted on the moving arm such that the carriage is slidable in a direction perpendicular to a slide direction of the moving arm, a belt wrapped around the pulleys and connected to the carriage, and a plurality of idlers for guiding the belt.

The plurality of idlers may include a pair of first idlers installed at the mount so as to turn the belt perpendicularly, a pair of second idlers installed at the mount to be spaced apart from the pair of first idlers so as to turn the belt perpendicularly, a pair of third idlers installed at a position on the moving arm opposite the pair of first idlers so as to turn the belt in the opposite direction, and a fourth idler installed at the carriage so as to turn the belt in the opposite direction.

The belt may be connected at one end thereof to the carriage and may be wrapped around the pair of third idlers, the pair of second idlers, one of the pulleys, the pair of first idlers and the fourth idler in this order.

The three-dimensional printer may further include a forming plate disposed in the case, and a lifting unit for moving the forming plate vertically, wherein the robot system moves the extruder over the forming plate.

The three-dimensional printer may further include a control unit for controlling the first and second motors, wherein the control unit controls the first and second motors to be concurrently driven, or controls one of the first and second motors to be driven while controlling the other to be stopped.

The rotating shafts of the first and second motors may rotate in directions opposite to each other to advance or retreat the carriage.

The rotating shafts of the first and second motors may rotate in the same direction to advance or retreat the carriage.

When one of the first and second motors is operated while the other is stopped, the moving arm and the carriage may linearly move to move the carriage in an inclined direction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an embodiment of the present invention will be described in detail with reference to the accompanying drawings.

Figure 1:
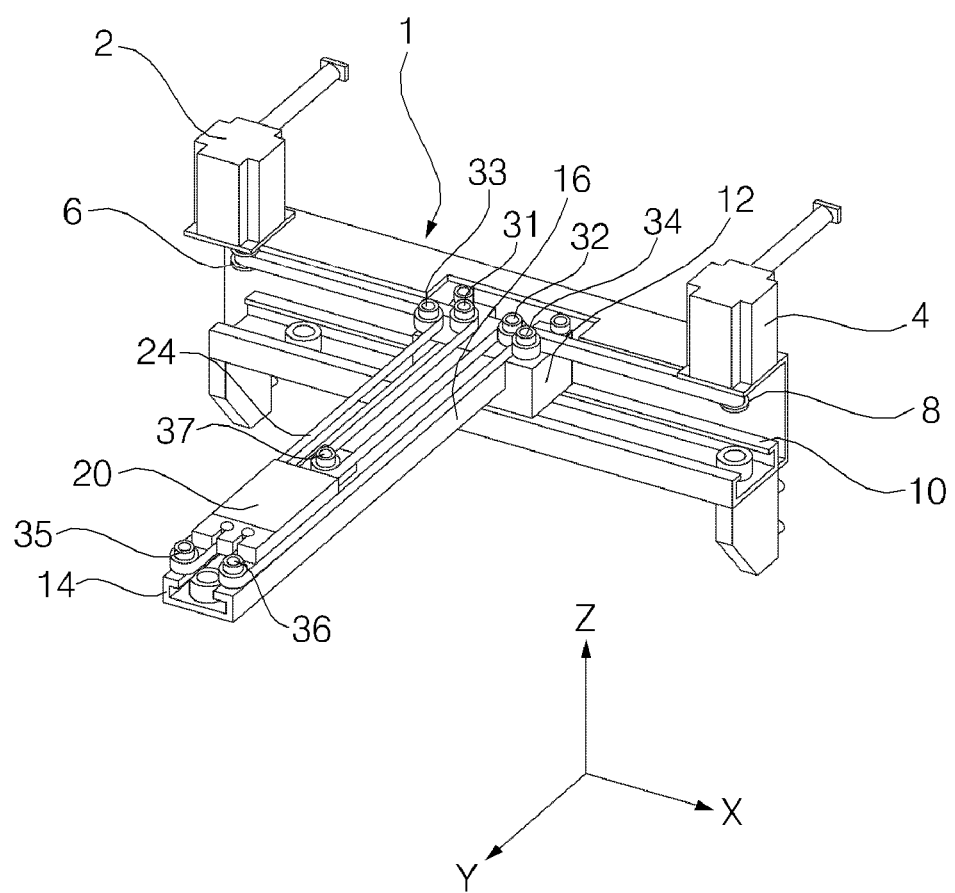
FIG. 1 is a perspective view showing a structure of a robot system according to an embodiment of the present invention.
Figure 2:
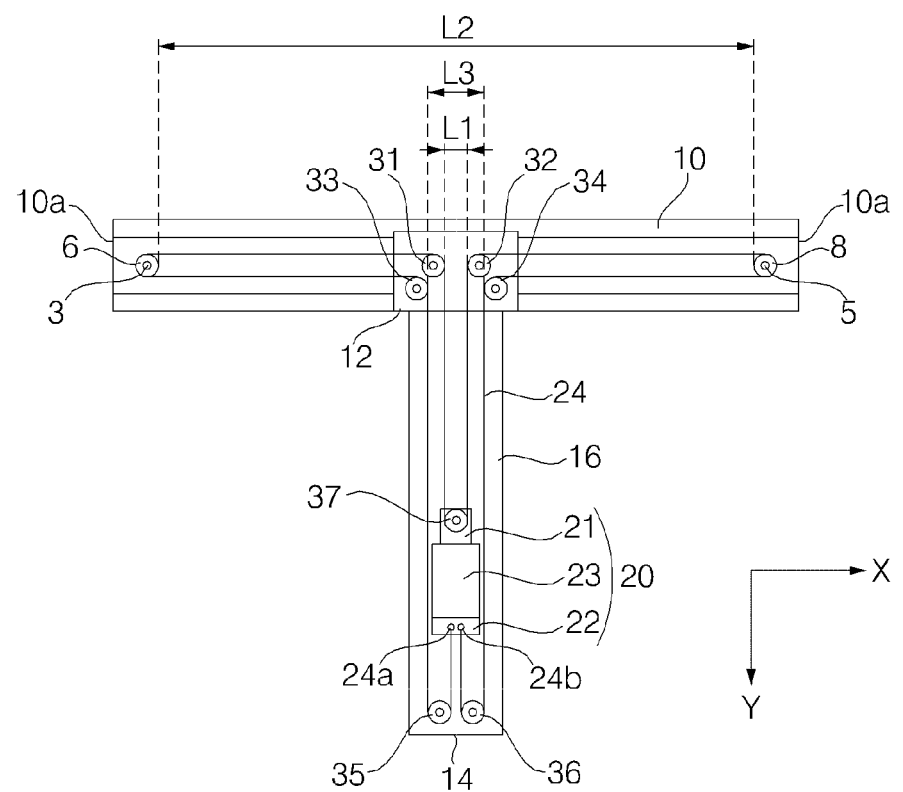
FIG. 2 is a plan view showing the robot system according to the embodiment of the present invention.

FIG. 1 is a perspective view showing a structure of a robot system according to an embodiment of the present invention. FIG. 2 is a plan view showing the robot system according to the embodiment of the present invention. FIGS. 3 to 10 are views showing an operational example of the robot system according to the embodiment of the present invention.

The robot system 1 according to the embodiment of the present invention includes a first motor 2 capable of normal and reverse rotation, a second motor 4 spaced apart from the first motor 2 and capable of normal and reverse rotation, and pulleys 6 and 8 coupled to a rotating shaft 3 of the first motor 2 and a rotating shaft 5 of the second motor 4, respectively.

The robot system 1 further includes a frame 10, and a moving arm 16 slidably mounted on the frame 10. The moving arm 16 includes a mount 12 slidably mounted on the frame 10. The end of the moving arm 16, which is opposite to the mount 12 in a longitudinal direction, may be a free end 14.

The robot system 1 further includes a carriage 20 slidably mounted on the moving arm 16, a belt 24 wrapped around the pulleys 6 and 8 and connected to the carriage 20, and a plurality of idlers 31 to 37 for guiding the belt 24. The carriage 20 may be mounted on the moving arm 16 such that it is slidable in the direction (Y axis) perpendicular to the sliding direction (X axis) of the moving arm 16.

The robot system 1 may move the moving arm 16 in a state of the single moving arm 16 being supported on the single frame 10. When at least one of the two motors 2 and 4 is operated, the robot system 1 may smoothly move the carriage 20 on a two-dimensional plane. The robot system 1 may move the carriage 20 on the horizontal plane in a two-dimensional manner, that is, in X and Y directions.

The moving arm 16 may be mounted on a pair of frames spaced apart from each other. In this case, the opposite ends of the moving arm 16 may be mounted on the pair of frames, respectively. In this case, the pair of frames have to be installed at the normal positions, respectively, in order to achieve the horizontal state of the moving arm 16. The pair of frames have to accurately coincide with each other in the horizontal plane.

When the single moving arm 16 is mounted and supported on the single frame 10 as in this embodiment, disposition of the moving arm 16 may be completed by simple operation of positioning the single frame 10 at the normal position on the horizontal plane.

In the robot system 1, a device to be moved may be installed at the carriage 20, and the device installed at the carriage 20 may be moved by movement of the carriage 20.

The device installed at the carriage 20 may be an extruder for extruding material used in formation of a three-dimensional object (hereinafter, referred to as a three-dimensional object). In this case, the robot system 1 may be a component of a three-dimensional printer for forming a three-dimensional object.

Meanwhile, the device installed at the carriage 20 may be a cutting tool such as a drill. In this case, the robot system 1 may be a component of a machine tool.

Furthermore, the device installed at the carriage 20 may be a surgical tool such as a knife. In this case, the robot system may be a component of a medical instrument.

The robot system 1 may, of course, be applied to any machine for moving a device installed at the carriage 20 in the X-Y plane.

The first motor 2 and the second motor 4 may drive the belt 24 in the state of being spaced apart from each other. The rotating shaft 3 of the first motor 2 and the rotating shaft 5 of the second motor 4 may be disposed parallel to each other. Both the rotating shaft 3 of the first motor 2 and the rotating shaft 5 of the second motor 4 may extend in the vertical direction.

The rotating shaft 3 of the first motor 2 may protrude downward from the first motor 2, and the rotating shaft 5 of the second motor 4 may protrude downward from the second motor 4.

The first motor 2 and the second motor 4 may be operated such that the first motor 2 is driven in conjunction with the second motor 4, or one of the first and second motors 2 and 4 is driven while the other is stopped.

A moving direction of the carriage 20 when the first and second motors 2 and 4 are driven concurrently may be different from a moving direction of the carriage 20 when one of the first and second motors 2 and 4 is independently driven.

A moving direction of the carriage 20 when the rotating shaft 3 of the first motor 2 is rotating in a first rotational direction may be different from a moving direction of the carriage 20 when the rotating shaft 3 of the first motor 2 is rotating in a second rotational direction.

A moving direction of the carriage 20 when the rotating shaft 5 of the first motor 4 is rotating in a first rotational direction may be different from a moving direction of the carriage 20 when the rotating shaft 5 of the second motor 4 is rotating in a second rotational direction.

The first rotational direction may be one of the clockwise direction and the counterclockwise direction, and the second rotational direction may be the other of the clockwise direction and the counterclockwise direction. Referring to FIGS. 3 to 10, when the first rotational direction is the clockwise direction, the second rotational direction may be the counterclockwise direction. In contrast, when the first rotational direction is the counterclockwise direction, the second rotational direction may be the clockwise direction. The rotation of each rotating shaft of the first and second motors 2 and 4 may be defined such that the clockwise rotation of the rotating shaft is referred to as normal rotation and the counterclockwise rotation of the rotating shaft is referred to as reverse rotation.

The pulleys 6 and 8 may include a first pulley 6 coupled to the rotating shaft 3 of the first motor 2, and a second pulley 8 coupled to the rotating shaft 5 of the second motor 4. The first pulley 6 and the second pulley 8 may be disposed above the frame 10 in the state of being spaced from the frame 10. The first pulley 6 and the second pulley 8 may be disposed spaced from each other in the longitudinal direction of the frame 10. The first pulley 6 may be positioned closer to one end 10a of the frame 10 than the other end 10b of the frame 10. The second pulley 8 may be positioned closer to the other end 10b of the frame 10 than the one end 10a of the frame 10.

The frame 10 may serve not only as a moving arm support for supporting the moving arm 16, but also as a moving arm guide for guiding sliding of the moving arm 16.

The frame 10 may extend in the moving direction of the moving arm 16. The frame 10 may be disposed in the horizontal direction. The moving arm 16 may move in the longitudinal direction under the condition that the mount 12 is mounted on the frame 10.

When the frame 10 is disposed in the lateral direction (X direction), the moving arm 16 may be disposed in the anteroposterior direction (Y direction). When the frame 10 is disposed in the anteroposterior direction (Y direction), the moving arm 16 may be disposed in the lateral direction.

One of the moving arm 16 and the frame 10 may be provided with a slide guide capable of guiding sliding of the moving arm 16 such that the slide guide extends in the moving direction of the moving arm 16. The other of the moving arm 16 and the frame 10 may be provided with a guide member which is guided by the slide guide.

The moving arm 16 may serve not only as a carriage support for supporting the carriage 20, but also as a carriage guide for guiding sliding of the carriage 20. The moving arm 16 may extend in the moving direction (Y direction) of the carriage 20. The moving arm 16 may extend horizontally. The carriage 20 may move in the longitudinal direction Y of the moving arm 16 in the state of being mounted on the moving arm 16. When the mount 12 of the moving arm 16 is positioned at the center of the frame 10, the entire structure of the moving arm 16 and the frame 10 may define a "T" shape as viewed from above.

Ends 24a and 24b of the belt 24 may be connected to the carriage 20. Accordingly, the belt 24 may push or pull the carriage 20 while being guide by the plurality of idlers 31 to 37 upon rotation of the pulleys 6 and 8. When the mount 12 of the moving arm 16 is positioned at the center of the frame 10, the entire structure of the belt 24 may define a "T" shape. The belt 24 may extend in the longitudinal direction (X direction) of the frame 10 at a part thereof disposed above the frame 10. Meanwhile, the belt 24 may extend in the longitudinal direction (Y direction) of the moving arm 16 at a part thereof disposed above the moving arm 16.

As shown in FIGS. 3 to 6, when the first motor 2 and the second motor 4 are concurrently driven, the belt 24 may move one of the carriage 20 and the moving arm 16.

As shown in FIGS. 7 to 10, when one of the first motor 2 and the second motor 4 is driven and the other is stopped, the belt 24 may concurrently move both the carriage 20 and the moving arm 16.

The plurality of idlers 31 to 37 may include a pair of first idlers 31 and 32 installed at the mount 12 so as to turn the belt 24 perpendicularly at positions on the mount 12.

The plurality of idlers 31 to 37 may further include a pair of second idlers 33 and 34 installed at the mount 12 to be spaced apart from the pair of first idlers 31 and 32 so as to turn perpendicularly the belt 24 at positions on the mount 12.

The plurality of idlers 31 to 37 may further include a pair of third idlers 35 and 36 installed at positions on the moving arm 16 opposite the pair of first idlers 31 and 32 so as to turn the belt 24 in the opposite direction.

The plurality of idlers 31 to 37 may further include a fourth idler 37 installed at the carriage 20 so as to turn the belt 24 in the opposite direction.

The belt 24 may be connected at ends 24a and 24b thereof to the carriage 20, and may be wrapped around the third idlers 35 and 36, the second idlers 33 and 34, the pulleys 6 and 8, the first idlers 31 and 32 and the fourth idler 37 in this order.

A width L1 between the pair of first idlers 31 and 32 may be smaller than a width L2 between the first pulley 6 and the second pulley 8. The pair of first idlers 31 and 32 may include a first right idler 31 and a first left idler 32.

A width L3 between the pair of second idlers 33 and 34 may be larger than the width L1 between the pair of first idlers 31 and 32. The width L3 between the pair of second idlers 33 and 34 may be smaller than the width L2 between the first pulley 6 and the second pulley 8. The pair of second idlers 33 and 34 may be disposed closer to the carriage 20 than the pair of first idlers 31 and 32. The pair of second idlers 33 and 34 may include a second right idler 33 and a second left idler 34.

The pair of third idlers 35 and 36 may include a third right idler 35 and a third left idler 36.

The fourth idler 37 may be disposed to face an area between the pair of first idlers 31 and 32 in the longitudinal direction (Y direction) of the moving arm 16. In other words, the fourth idler 37 may be disposed to face the area between the first right idler 31 and the first left idler 32.

The carriage 20 may be provided with an idler installation portion 21 to which the fourth idler 37 is rotatably coupled.

The carriage 20 may be provided with a belt connecting portion 22 to which the one end 24a and the other end 24b of the belt 24 are connected.

The carriage 20 may be provided with a device installation portion 23 disposed between the idler installation portion 21 and the belt connecting portion 22, at which a device (not shown) to be moved is installed.

The carriage 20 may move between the pair of first idlers 31 and 32 and the pair of third idlers 35 and 36 in the longitudinal direction (Y direction) of the moving arm 16. The belt connecting portion 22 of the carriage 20 may be positioned to face the pair of third idlers 35 and 36. The idler installation portion 21 of the carriage 20 may be positioned to face an area between the pair of first idlers 31 and 32.

The one end 24a and the other end 24b of the belt 24 may pull the carriage 20 toward the pair of third idlers 35 and 36. When the fourth idler 37 is pulled by the belt 24, the fourth idler 37 may pull the carriage 20 toward the pair of first idlers 31 and 32.

The one end 24a of the belt 24 may be connected to the belt connecting portion 22 of the carriage 20. The belt 24 may be turned 180° by the third right idler 35. The belt 24 may pass over a right lateral side of the carriage 20 and may be turned 90° by the second right idler 33. Subsequently, the belt 24 may be turned 180° by the first pulley 6, and then may be turned 90° by the first right idler 31. Thereafter, the belt 24 may be wrapped around the fourth idler 37.

The belt 24 may be turned 180° by the fourth idler 37, and then may be turned 90° by the first left idler 32. Subsequently, the belt 24 may be turned 180° by the second pulley 8, and then may be turned 90° by the second left idler 34. The belt 24 may pass over a left lateral side of the carriage 20, and may be turned 180° by the third left idler 36. The other end 24b of the belt 24 may be connected to the belt connecting portion 22 of the carriage 201.

The belt 24 may contact the third right idler 35-> the second right idler 33-> the first pulley 6-> the first right idler 31-> the fourth idler 37-> the first left idler 32-> the second pulley 8-> the second left idler 34-> the third left idler 36 in this order from the one end 24a to the other end 24b.

The belt 24 may include a first section defined between the one end 24a and the third right idler 35 and disposed above the moving arm 16, and a second section defined between the third right idler 35 and the second right idler 33 and disposed above the moving arm 16.

Furthermore, the belt 24 may include a third section defined between the second right idler 33 and the first pulley 6 and disposed above the mount 12 and the frame 10, and a fourth section defined between the first pulley 6 and the first right idler 31 and disposed above the mount 12 and the frame 10.

Furthermore, the belt 24 may include a fifth section defined between the first right idler 31 and the fourth idler 37 and disposed above the moving arm 16, and a sixth section defined between the fourth idler 37 and the first left idler 32 and disposed above the moving arm 16.

Furthermore, the belt 24 may include a seventh section defined between the first left idler 32 and the second pulley 8 and disposed above the mount 12 and the frame 10, and a eighth section defined between the second pulley 8 and the second left idler 34 and disposed above the mount 12 and the frame 10.

Furthermore, the belt 24 may include a ninth section defined between the second left idler 34 and the third left idler 36 and disposed above the moving arm 16, and a tenth section defined between the third left idler 36 and the other end 24b of the belt 24 and disposed above the moving arm 16.

The belt 24 may move the carriage 20 while respective lengths of the first to tenth sections vary.

For convenience of explanation, left and right directions and front and rear directions are additionally shown in FIGS. 3 to 10.

Figure 3:
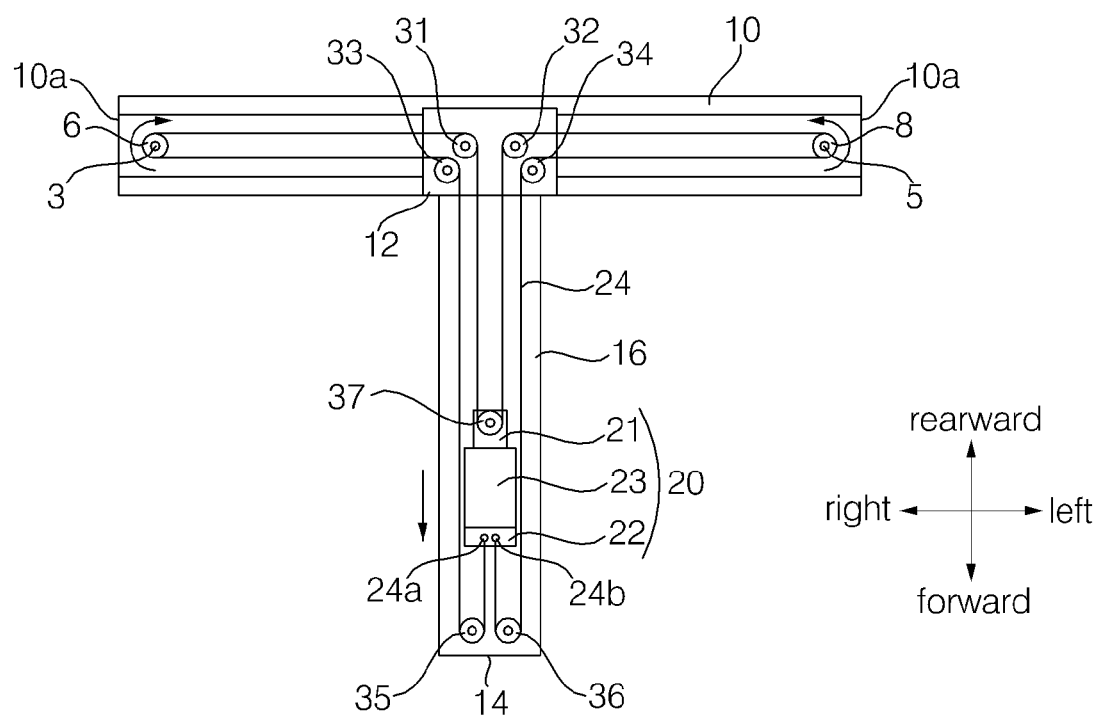
FIG. 3 is a plan view showing the robot system according to the embodiment of the present invention when the first motor rotates clockwise whereas the second motor rotates counterclockwise.
Figure 4:
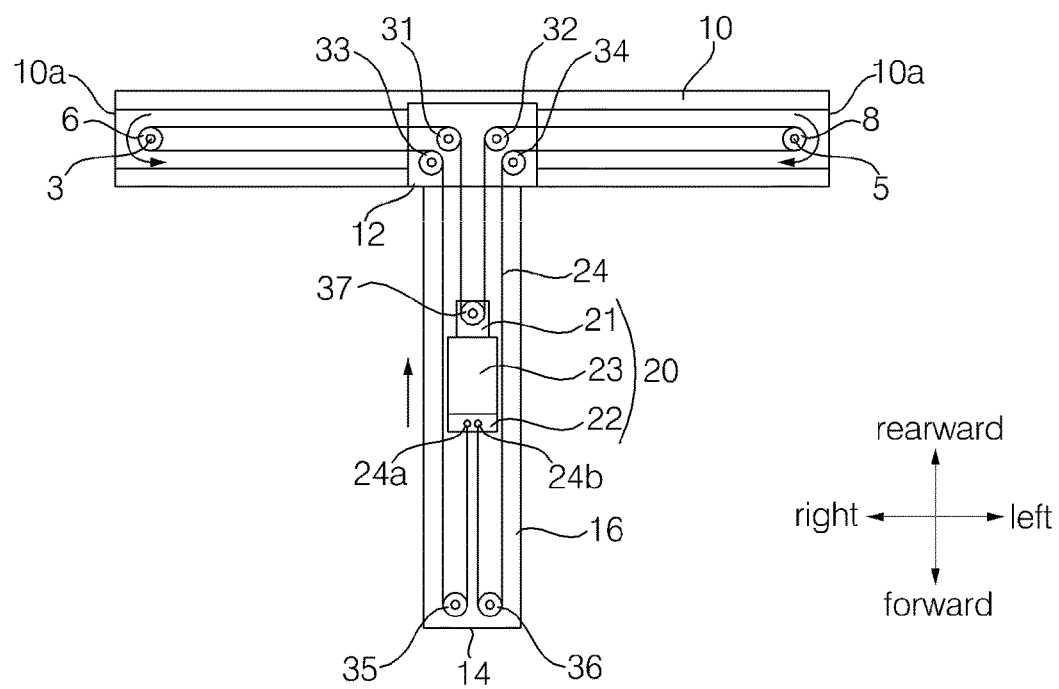
FIG. 4 is a plan view showing the robot system according to the embodiment of the present invention when the first motor rotates counterclockwise whereas the second motor rotates clockwise.

As shown in FIGS. 3 and 4, the first motor 2 and the second motor 4 may have a carriage advancing mode in which the rotating shaft 3 of the first motor 2 and the rotating shaft 5 of the second motor 4 rotate in the directions opposite to each other to advance or retreat the carriage 20.

FIG. 3 is a plan view showing the robot system according to the embodiment of the present invention when the first motor 2 rotates clockwise whereas the second motor 4 rotates counterclockwise.

When the first motor 2 rotates clockwise whereas the second motor 4 rotates counterclockwise, the carriage 20 may advance toward the pair of third idlers 35 and 36 (i.e., in the forward direction) as shown in FIG. 3.

FIG. 4 is a plan view showing the robot system according to the embodiment of the present invention when the first motor 2 rotates counterclockwise whereas the second motor 4 rotates clockwise.

When the first motor 2 rotates counterclockwise whereas the second motor 4 rotates clockwise, the carriage 20 may advance toward the pair of first idlers 31 and 32 (i.e., in the rearward direction) as shown in FIG. 4.

As shown in FIGS. 3 and 4, when the first motor 2 and the second motor 4 rotate in opposite directions, the robot system 1 may advance or retreat only the carriage 20 along the moving arm in an anteroposterior direction without movement of the moving arm 16.

Figure 5:
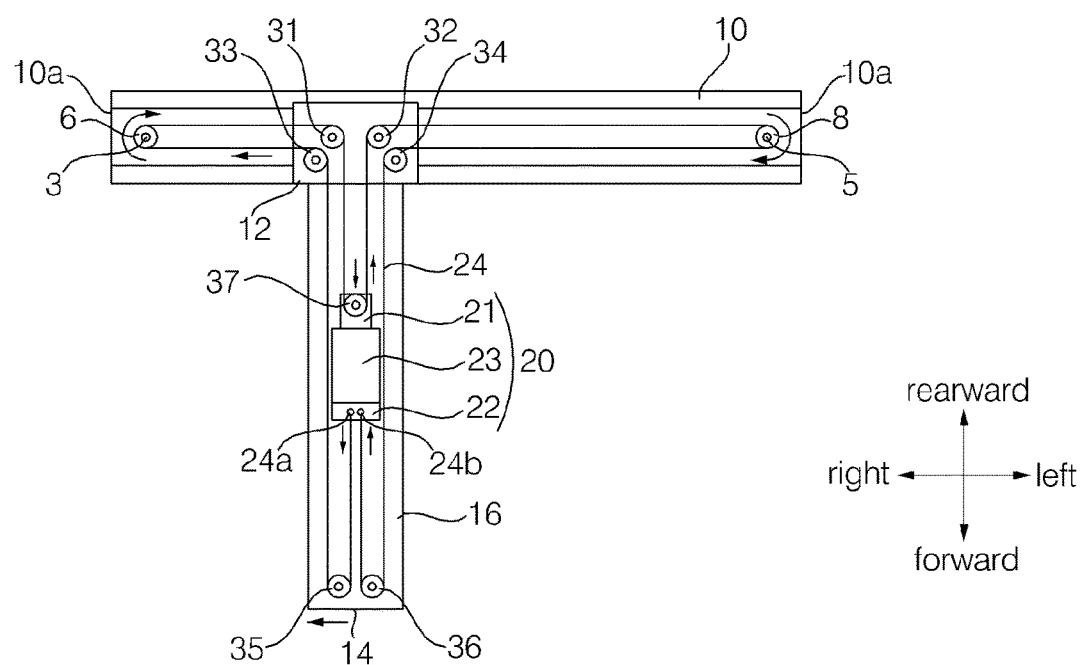
FIG. 5 is a plan view showing the robot system according to the embodiment of the present invention when both the first motor and the second motor rotate clockwise.
Figure 6:
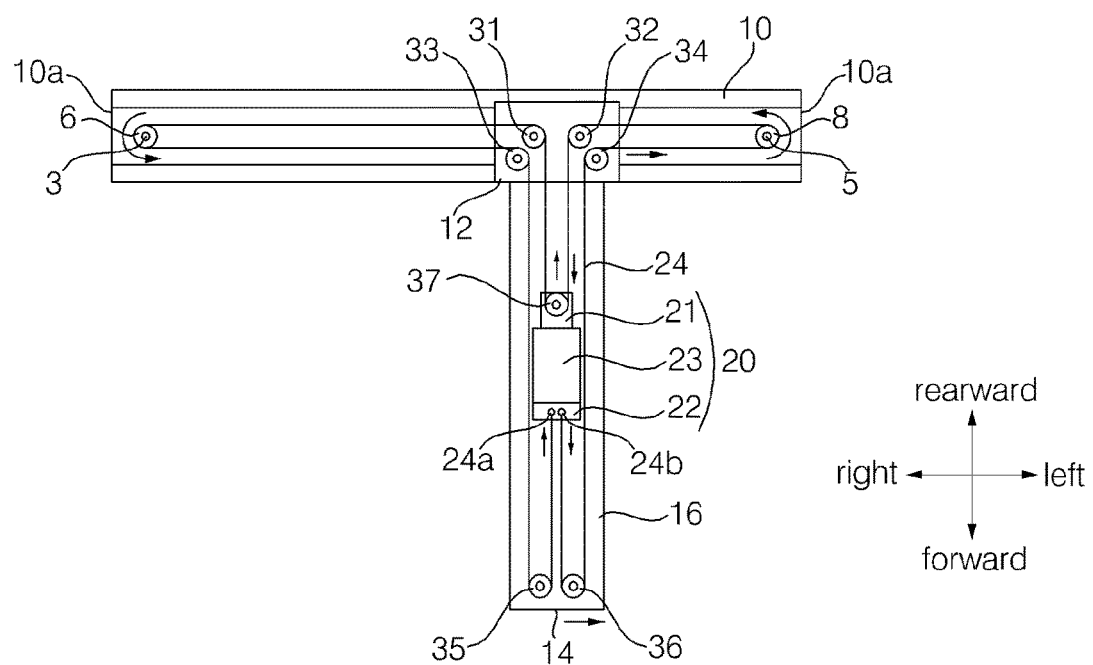
FIG. 6 is a plan view showing the robot system according to the embodiment of the present invention when both the first motor and the second motor rotate counterclockwise.

As shown in FIGS. 5 and 6, the first motor 2 and the second motor 4 may have a moving arm advancing mode in which the rotating shafts 3 and 5 rotate in the same direction to advance or retreat the moving arm 16.

FIG. 5 is a plan view showing the robot system according to the embodiment of the present invention when both the first motor 2 and the second motor 4 rotate clockwise.

When both the first motor 2 and the second motor 4 rotate clockwise, the carriage 20 does not linearly move along the moving arm 16 and the moving arm 16 may move toward the first motor 2 (i.e., in the right direction) along the frame 10, as shown in FIG. 5.

FIG. 6 is a plan view showing the robot system according to the embodiment of the present invention when both the first motor 2 and the second motor 4 rotate counterclockwise.

When both the first motor 2 and the second motor 4 rotate counterclockwise, the carriage 20 does not linearly move along the moving arm 16 and the moving arm 16 may move toward the second motor 4 (i.e., in the left direction) along the frame 10, as shown in FIG. 6.

As shown in FIGS. 5 and 6, when both the first motor 2 and the second motor 4 rotate in the same direction, the robot system 1 may linearly move the moving arm 16 in the longitudinal direction (i.e., in the lateral direction) without movement of the carriage 20 in the anteroposterior direction and the carriage 20 may linearly move in the lateral direction together with the moving arm 16.

As shown in FIGS. 7 to 10, the first motor 2 and the second motor 4 may have a carriage sloping mode in which one of the first motor 2 and the second motor 4 is driven and the other is stopped and, as such, the moving arm 16 and the carriage 20 linearly move such that the carriage 20 obliquely moves.

Figure 7:
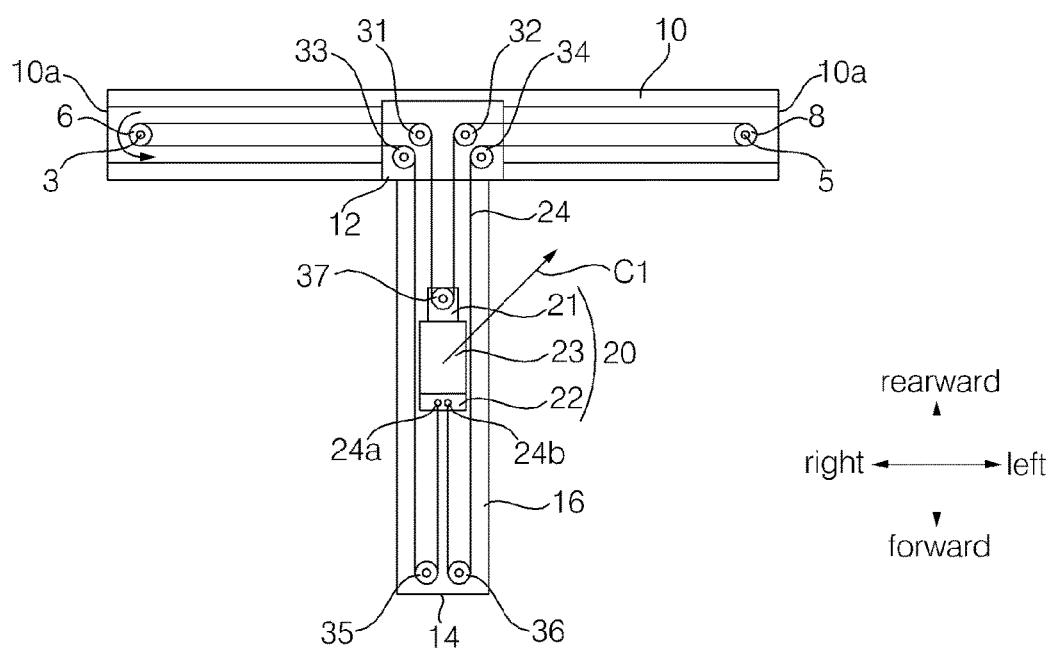
FIG. 7 is a plan view showing the robot system according to the embodiment of the present invention when the first motor rotates counterclockwise and the second motor is stopped.

FIG. 7 is a plan view showing the robot system according to the embodiment of the present invention when the first motor 2 rotates counterclockwise and the second motor 4 is stopped.

When the first motor 2 rotates counterclockwise and the second motor 4 is stopped, the moving arm 16 moves toward the second pulley 8 (i.e., in the left direction). At this time, the carriage 20 may move the pair of first idlers 31 and 32 (i.e., in the rearward direction). By the concurrent movement of the moving arm 16 and the carriage 20, the carriage 20 may move in the left and rearward direction, that is, in an inclined direction C1 in FIG. 7.

Figure 8:
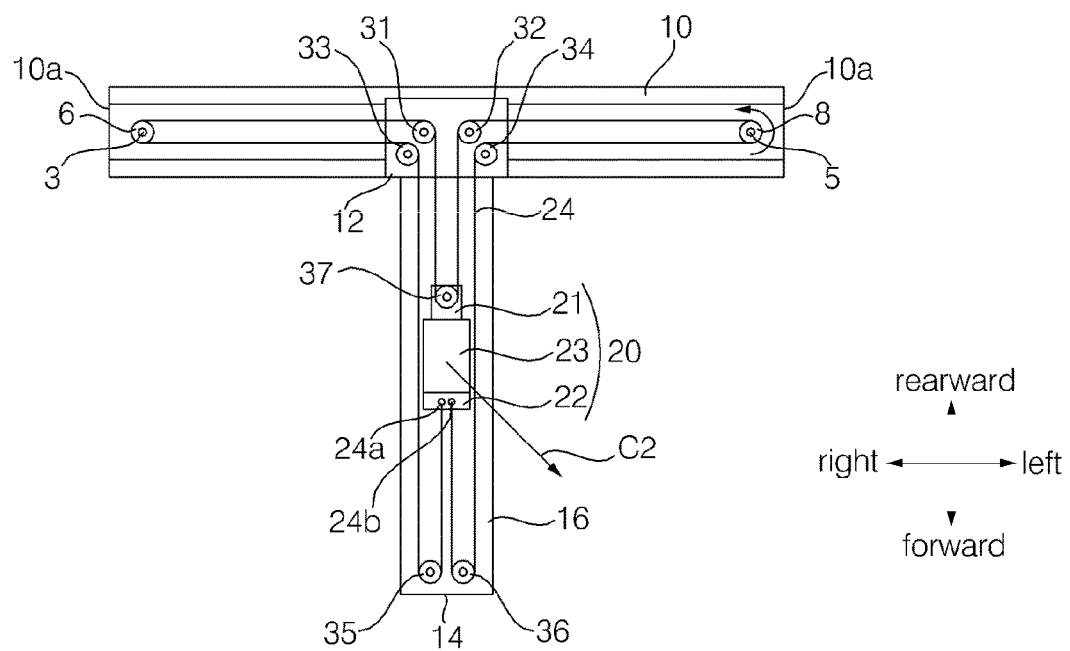
FIG. 8 is a plan view showing the robot system according to the embodiment of the present invention when the first motor is stopped and the second motor rotates counterclockwise.

FIG. 8 is a plan view showing the robot system according to the embodiment of the present invention when the first motor 2 is stopped and the second motor 4 rotates counterclockwise.

When the first motor 2 is stopped and the second motor 4 rotates counterclockwise, the moving arm 16 may move toward the second pulley 8 (i.e., in the left direction) and the carriage 20 may move toward the pair of third idlers 35 and 36 (i.e., in the forward direction). By the concurrent movement of the moving arm 16 and the carriage 20, the carriage 20 may move in the left and forward direction, that is, in an inclined direction C2 in FIG. 8.

Figure 9:
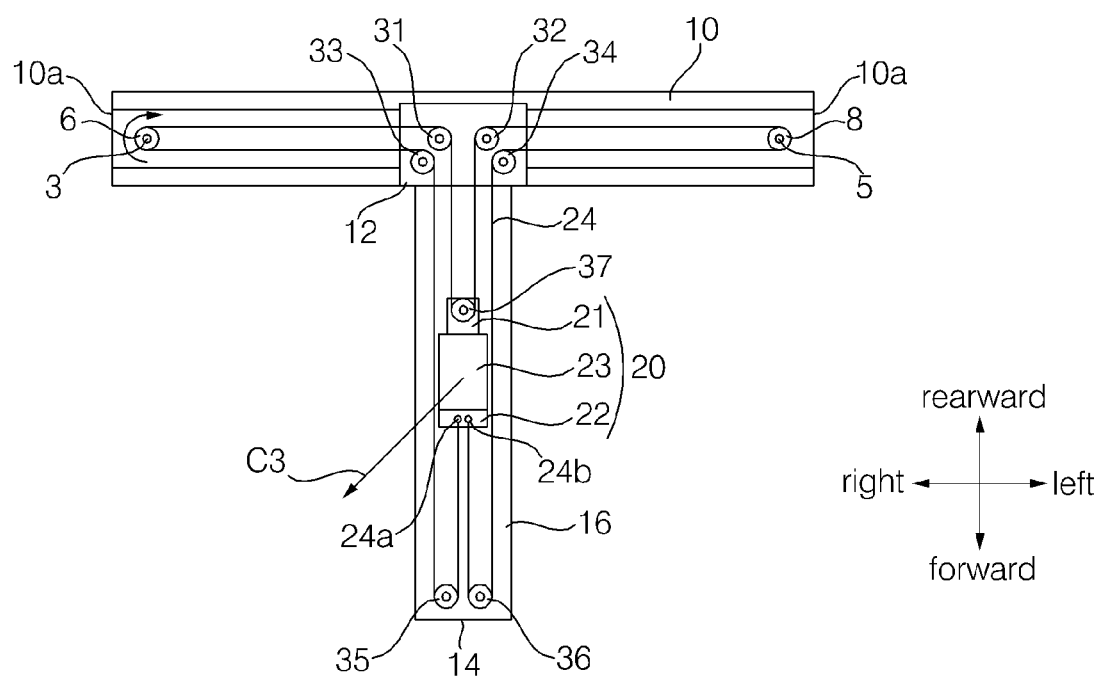
FIG. 9 is a plan view showing the robot system according to the embodiment of the present invention when the first motor rotates clockwise and the second motor is stopped.

FIG. 9 is a plan view showing the robot system according to the embodiment of the present invention when the first motor 2 rotates clockwise and the second motor 4 is stopped.

When the first motor 2 rotates clockwise and the second motor 4 is stopped, the moving arm 16 may move toward the first pulley 6 (i.e., in the right direction) and the carriage 20 may move toward the pair of third idlers 35 and 36 (i.e., in the forward direction). By the concurrent movement of the moving arm 16 and the carriage 20, the carriage 20 may move in the right and forward direction, that is, in an inclined direction C3.

Figure 10:
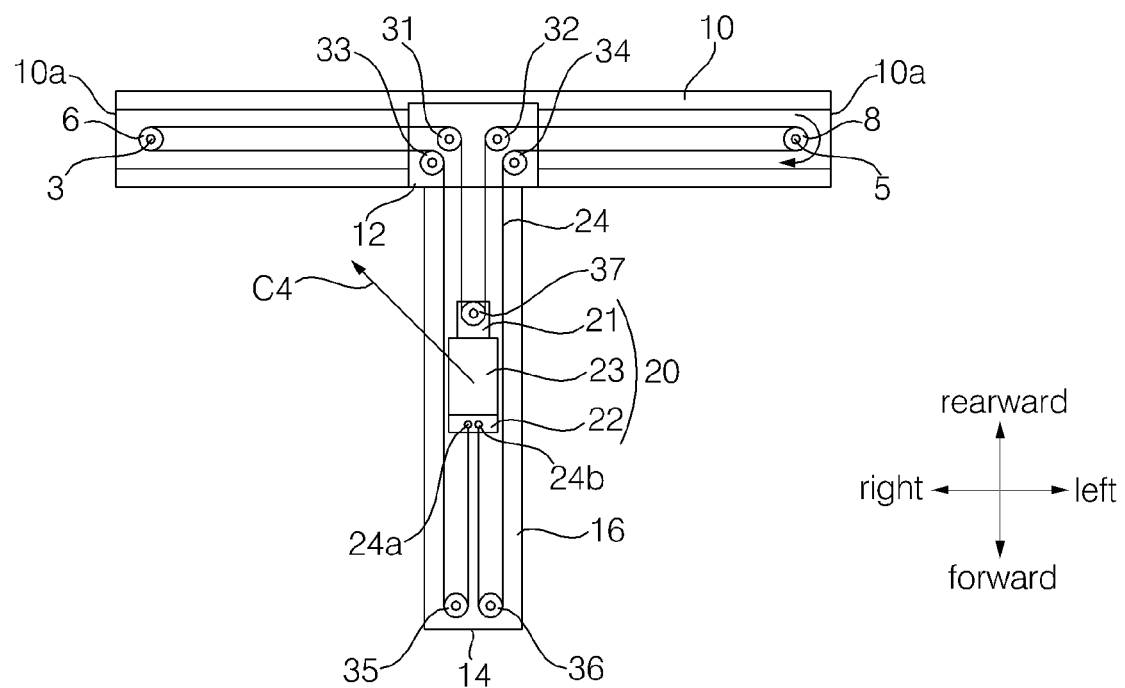
FIG. 10 is a plan view showing the robot system according to the embodiment of the present invention when the first motor is stopped and the second motor rotates clockwise.

FIG. 10 is a plan view showing the robot system according to the embodiment of the present invention when the first motor 2 is stopped and the second motor 4 rotates clockwise.

When the first motor 2 is stopped and the second motor 4 rotates clockwise, the moving arm 16 may move toward the first pulley 6 (i.e., in the right direction) and the carriage 20 may move toward the pair of first idlers 31 and 32 (i.e., in the rearward direction). By the concurrent movement of the moving arm 16 and the carriage 20, the carriage 20 may move in the right and rearward direction, that is, in an inclined direction C4.

In conclusion, the robot system 1 may operate in such a way that one of the first motor 2 and the second motor 4 is operated and the other is stopped so as to linearly move the moving arm 16 and the carriage 20, thus moving the carriage 20 in the inclined directions C1 to C4, as shown in FIGS. 7 to 10.

When the robot system 1 is applied to a three-dimensional printer, three-dimensional objects may be precisely formed. Hereinafter, an example in which the robot system 1 is applied to the three-dimensional printer will be described.

Figure 11:
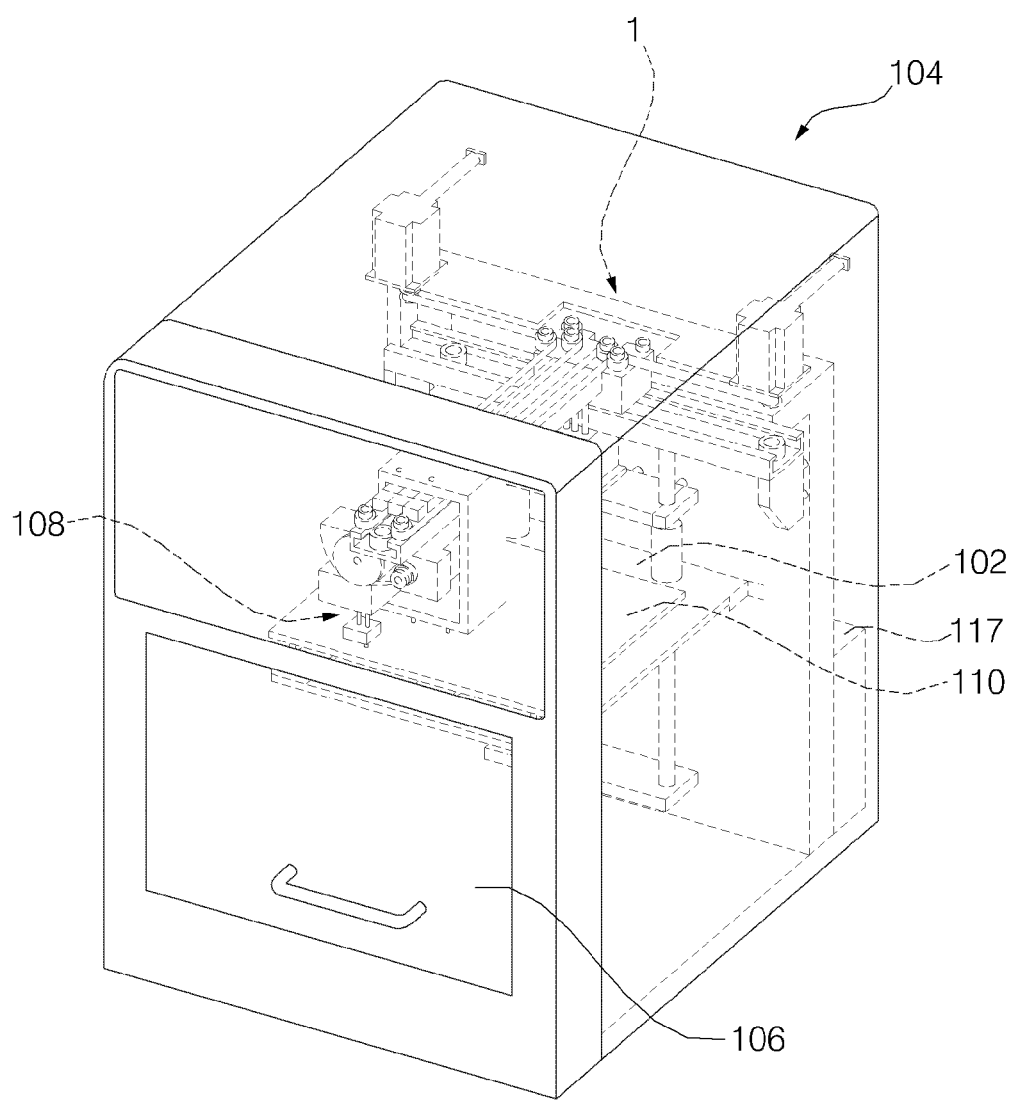
FIG. 11 is a perspective view showing the three-dimensional printer including a robot system according to an embodiment of the present invention.
Figure 12:
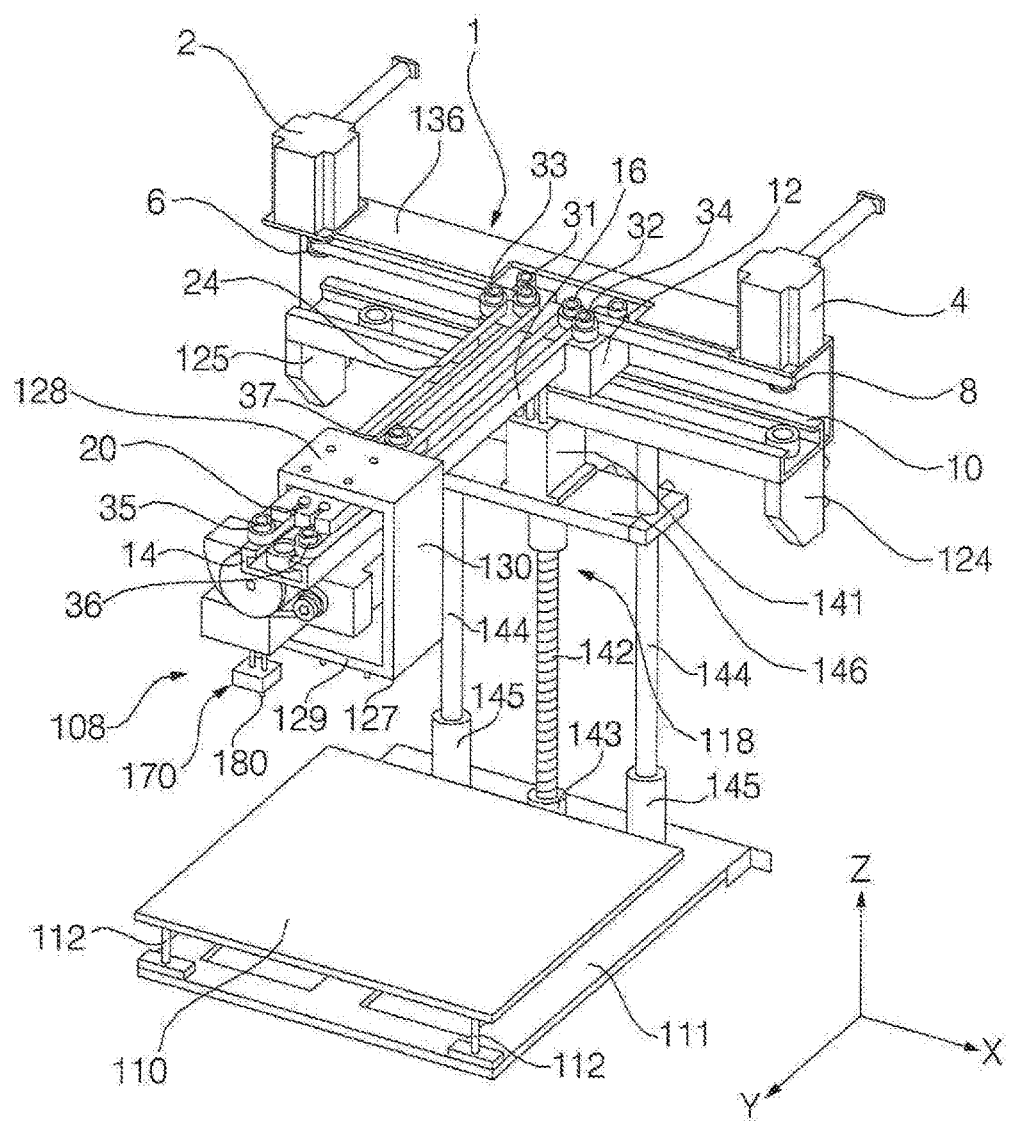
FIG. 12 is a perspective view showing the three-dimensional printer according to the embodiment of the present invention in which the robot system is shown together with a lifting unit.

FIG. 11 is a perspective view showing the three-dimensional printer including a robot system according to an embodiment of the present invention, and FIG. 12 is a perspective view showing the three-dimensional printer according to the embodiment of the present invention in which the robot system is shown together with a lifting unit.

The three-dimensional printer including a robot system according to the embodiment of the present invention may include a robot system 1, a case 104 having a cavity 102 defined therein, and an extruder 108 for melting and extruding a filament.

A filament, which is a long fiber obtained from a cellulosic fiber and a synthetic fiber, may be a raw material of a three-dimensional product to be produced.

The three-dimensional printer including a robot system may include a forming plate 110 disposed in the case 102, and the lifting unit 118 for lifting the forming plate 110.

The robot system 1 may be disposed in the case 2. The robot system 1 may be provided with the extruder 108, and may move the extruder 108. The extruder 108 may be mounted on the carriage 20 of the robot system 1. The robot system 1 may move the extruder 108 in a two-dimensional plane by moving the carriage 20 in the two-dimensional plane.

The robot system 1 may move the extruder 108 in the cavity 102. The robot system 1 may move the extruder 108 above the forming plate 10. As shown in FIGS. 3 to 10, the robot system 1 may move the extruder 108 in a smooth and precise manner in the X-Y plane by driving one or both of the first motor 2 and the second motor 4. Consequently, the robot system 1 may more precisely and neatly form a three-dimensional object.

The robot system 1 may be installed in the case 104. The frame 10 of the robot system 1 may be installed in the case 104 such that the frame 10 extends in the lateral direction (X direction). The frame 10 may be mounted on the case 104 by means of one or more frame holders 124 and 125. The frame holders 124 and 125 may include a first holder 124 which is mounted on a left part of the frame 10 and is fixed to the case 104, and a second holder 125 which is mounted on a right part of the frame 10 and is fixed to the case 104.

The moving arm 16 of the robot system 1 has a rear end which may serve as the mount 12, and a front end which may serve as a free end 14. The moving arm 16 may slide along an upper surface of the frame 10 in the lateral direction (X direction). The robot system 1 may move the carriage 20 by the single arm structure in which a front end of the moving arm 16 is a free end.

The extruder 108 may be connected to the carriage 20 by means of a connecting bracket 127. The connecting bracket 127 may include an upper plate which is partially mounted on an upper surface of the carriage 20 and is fastened thereto, and a lower plate 129 which is partially positioned below the moving arm 16 and on which the extruder 108 is mounted. The connecting bracket 127 may further include connecting plates 130 which connect the upper plate 128 to the lower plate 129 and which are partially positioned on both sides of the moving arm 16.

The first motor 2 and the second motor 4 of the robot system 1 may be mounted on a motor holder 136. The motor holder 136 may be installed to be positioned above the frame 10. The motor holder 136 may be mounted on at least one of the frame 10 and the case 104.

The case 104 may define the external appearance of the three-dimensional printer including a robot system. The cavity 102 may be defined in the case 104. The cavity 102 may be a space in which the robot system is accommodated and a three-dimensional object is formed.

The case 104 may be configured to have a hexahedral structure. The case 104 may include an opening formed at one surface thereof to allow a three-dimensional object to be taken out of the case. The opening may be formed at a front surface of the case 104.

The three-dimensional printer including a robot system may include a door 106 for opening and closing the opening. The door 106 may be slidably mounted on the case 104 to open and close the opening. Furthermore, the door may be swingably coupled to the case 104 by means of a hinge pin to open and close the opening. The door 106 may be swingably coupled to the case 104 by means of a rotating shaft provided at a lower end of the door 106.

As shown in FIG. 11, the robot system 1 may further include a filament supply 117 which receives a filament to be used in production of three-dimensional objects. The filament supply 117 may be installed at the outside or the inside of the case 104. The filament supply 117 may include a drum around which a filament is wound. The drum may be rotatably provided at the case 104. The filament wound around the drum may be supplied to the extruder 108.

The extruder 108 may be movably positioned in the cavity 102, and may melt and extrude the filament.

The extruder 108 may have a smaller size than the forming plate 110. The extruder 108 may be two-dimensionally moved above the forming plate 110 by means of the robot system 1, and may stack melted filament on the forming plate 110 while being three-dimensionally moved by the robot system 1 and the lifting unit 118.

The extruder 108 may include a heater 170 for heating a filament, and a nozzle 180 for discharging the filament heated and melted in the heater 170. The extruder 108 may be installed at the carriage 20 of the robot system 1, and may be moved in the cavity 102.

Melted filament extruded from the extruder 108 and a three-dimensional product may be placed on the forming plate 110. The forming plate 110 may be liftably disposed in the cavity 102.

The forming plate 110 may be placed on a base 111. The base 111 may be constituted by a forming plate supporting plate installed on a lower plate part of the case 104 shown in FIG. 11. The forming plate 110 may be placed on a plurality of support rods 112 vertically disposed on the base 111. Each of the plurality of support rods 112 may have an upper flat end, and the forming plate 110 may be placed on the upper flat ends of the support rods 112. The forming plate 110 may be horizontally positioned on the plurality of support rods 112.

The lifting unit 118 may move the forming plate 110 in the vertical direction (Z direction). The lifting unit 118 may be coupled to one of the forming plate 110 and the base 111. The lifting unit 118 may be coupled to the base 111 and may vertically move the forming plate 110 placed on the base 111 by vertically moving the base 111.

The lifting unit 118 may include a lifting motor 141, a screw 142 extending downward from the lifting motor 141, and a lifting gear 143 which engages with the screw 142 and vertically moved along the screw 142.

The lifting unit 118 may further include vertical rods 144 extending from the frame 10 downward, and lifting guides 145 vertically moving along the vertical rods 144.

The lifting motor 141 may be installed under the frame 10. The lifting unit 118 may further include a motor mount 146 installed at an upper portion of the vertical rods 144. The motor mount 146 may be installed at the vertical rods 144 to be vertically spaced apart from the frame 10. The lifting motor 141 may be installed at the motor mount 146 to be disposed between the frame 10 and the motor mount 146.

The screw 142 may be rotated clockwise or counterclockwise by the lifting motor 141.

The lifting gear 143 may be coupled to the base 111. The lifting gear 143 may be vertically moved along the screw 142 to vertically move the forming plate 110 upon rotation of the screw 142.

The vertical rods 144 may be coupled at upper ends thereof to the frame 10. The vertical rods 144 may be coupled at lower ends thereof to the base 111. The vertical rods 144 may include a pair of vertical rods. The pair of vertical rods 144 may be laterally spaced apart from each other with the screw 142 disposed therebetween.

The lifting guides 145 may be coupled to the base 111, and may be configured to have a hollow cylinder shape. The lifting guides 145 may be guided along the vertical rods 144 upon vertical movement of the forming plate 110. The lifting guides 145 may include a pair of lifting guides similarly to the vertical rods 144. The pair of lifting guide 145 may be spaced apart from each other with the lifting gear 143 disposed therebetween.

Figure 13:
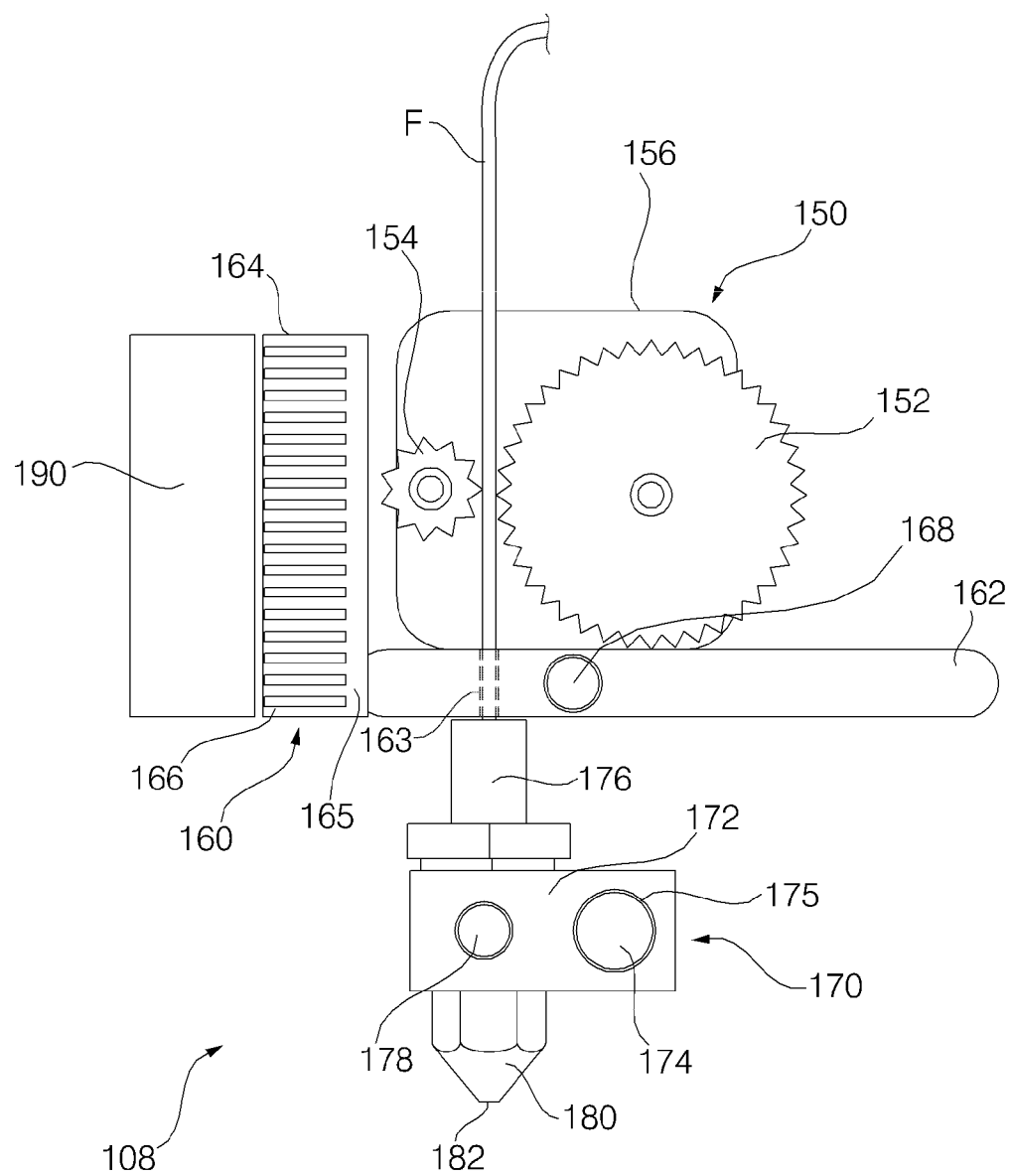
FIG. 13 is a view showing the extruder of the three-dimensional printer including a robot system according to the embodiment of the present invention.

FIG. 13 is a view showing the extruder of the three-dimensional printer including a robot system according to the embodiment of the present invention.

The extruder 108 may include a filament transfer part 150 for transferring a filament F, a cooling part 160 through which the filament F passes, a heating part 170 for heating the filament having passed through the cooling part 160, and a nozzle 180 for discharging the filament heated and thus melted in the heating part 170. The extruder 108 may further include a blower 190 for blowing air to the cooling part 160.

The filament transfer part 150 may draw in a filament F positioned at the outside of the extruder 108 and then may push out the filament F to the cooling part 160. The filament transfer part 150 may be disposed on a cooling plate 162 (described later) of the cooling part 160 so as to push the filament F downward to the cooling plate 162.

The filament transfer part 150 may include a pair of rollers 152 and 154 and thus the pair of rollers 152 and 154 may transfer a filament caught therebetween. The filament transfer part 150 may include a drive source 156 such as a motor for rotating one of the pair of rollers 152 and 154. The drive source 156 may be constituted by a stepper motor.

The cooling part 160 may include a cooling plate 162, and a radiating plate 164 in contact with the cooling plate 162.

The cooling plate 162 may be made of aluminum. The cooling plate 162 may be horizontally disposed. The cooling plate 162 may include a through hole 163 which is vertically formed thereat and through which the filament passes. The filament may contact the cooling plate 162 while passing through the through hole 163.

The radiating plate 164 may be a heat absorbing plate that absorbs heat from the cooling plate 162. The radiating plate 164 may be constituted by a heat sink. The radiating plate 164 may be installed to be perpendicular to the cooling plate 162. The radiating plate 164 may include a surface contact portion 165 contacting the cooling plate 162 in a surface contact manner, and a plurality of fins 166 protruding from the surface contact portion 65.

The cooling part 160 may include a cooling part temperature sensor 168 for detecting a temperature of the cooling part 160. The cooling part temperature sensor 168 may be provided at the cooling plate 162. The cooling part temperature sensor 168 may be constituted by a thermistor or a thermocouple for detecting a temperature of the cooling plate 162.

The heating part 170 may include a heating body 172 having a filament introduction hole through which a filament is introduced, and a heater 174 installed in the heating body 172.

The heating body 172 may include a heating space for receiving melted filament therein, and thus may heat the filament by heat transmitted from the heater 174. The heating body 172 may include a heater hole 175 formed therein in which the heater 174 is fitted, and the heater 174 may be installed at the heating body 172 by being fitted in the heater hole 175.

The heating part 170 may further include a connecting tube 176 connecting the heating body 172 to the cooling plate 162. The connecting tube 176 may include a filament channel for guiding a filament into the filament introduction hole of the heating body 172. The connecting tube 176 may be connected at an upper end thereof to the cooling plate 62 and at a lower end thereof to the heating body 172. The heating body 172 may be spaced apart from the cooling plate 162 by a distance corresponding to a height of the connecting tube 176.

The heating part 170 may include a heating part temperature sensor 178 for detecting a temperature of the heating part 170. The heating part temperature sensor 178 may be installed at the heating body 172. The heating part temperature sensor 178 may be constituted by a thermistor or a thermocouple for detecting a temperature of the heating body 172.

The nozzle 180 may be installed to protrude downward from the heating part 170. The nozzle 180 may be installed at the heating body 172 to protrude downward therefrom, and the melted filament in the heating body may be discharged through the nozzle 180 downward. The nozzle 180 may have a discharge hole 182 formed at a lower end thereof, through which the melted filament is discharged.

The blower 190 may be a cooling blower for cooling the cooling part 160. The blower 190 may be constituted by a fan motor in which a fan is integrated with a motor. The blower 190 may blow air present near the cooling part 160 to the cooling part 160. The blower 190 may be disposed to face the radiating plate 164, and may blow air to the plurality of fins 166 of the radiating plate 164, whereby the air absorbs heat from the radiating plate 164.

Figure 14:
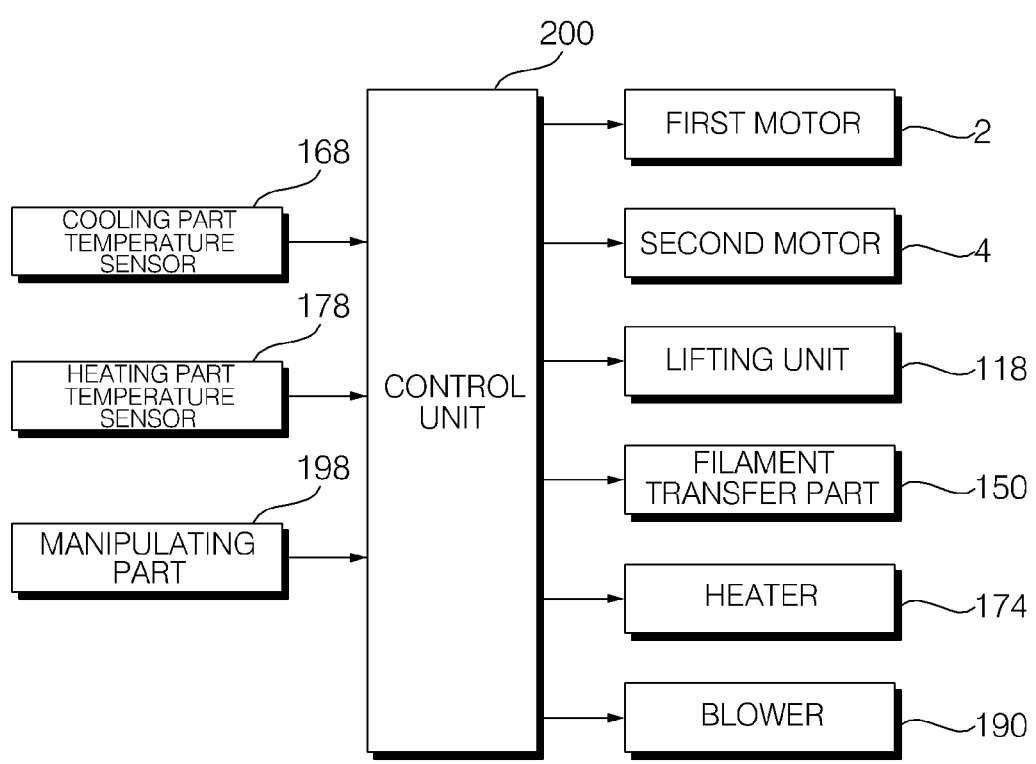
FIG. 14 is a control block diagram illustrating the three-dimensional printer including a robot system according to the embodiment of the present invention.

FIG. 14 is a control block diagram illustrating the three-dimensional printer including a robot system according to the embodiment of the present invention.

The three-dimensional printer including a robot system may further include a manipulating unit 198 that is manipulated by a user. The manipulating unit 198 may include an operation ON/Off input part for operating or stopping the three-dimensional printer including a robot system. The manipulating unit 198 may include a start input part for activating the three-dimensional printer including a robot system.

The three-dimensional printer including a robot system may include a control unit 200 for controlling the first motor 2 and the second motor 4 of the robot system 1.

During operation of the three-dimensional printer including a robot system, the control unit 200 may control the extruder 108. The control unit 100 may control the extruder 108 in consideration of a temperature detected by the cooling part temperature sensor 68 and a temperature detected by the heating part temperature sensor 78. The control unit 110 may control the filament transfer part 150, the heater 174 and the blower 190 while controlling the extruder 108.

The control unit 200 may control the lifting unit 118. Furthermore, the control unit 200 may control the lifting unit 118 in conjunction with the first motor 2 and the second motor 4 of the robot system 1.

As described above, according to the present invention, it is possible not only to control a position of the carriage by the total force of forces generated from the first and second motors but also to precisely control the carriage by the simply structured moving arm having the free end.

Furthermore, since the extruder installed at the carriage may smoothly move in a two-dimensional plane, it is possible to precisely form a three-dimensional object, thus providing a high-grade three-dimensional product.

Reference to the embodiment has allowed the present invention to be described in more detail, and it should be understood that the present invention is not limited to the embodiment but may be variously changed without departing from the technical idea of the present invention.

What is claimed is:

1. A three-dimensional printer including a robot system, comprising:
    an extruder including a heating block that heats a filament and a nozzle to discharge the filament having been heated and melted in the heating block;
    a base;
    a forming plate attached to the base;
    a lifter that moves the forming plate in a vertical direction, and
    a robot system that moves the extruder over the forming plate in an X-axis direction and a Y-axis direction perpendicular to the vertical direction,
    wherein the robot system includes:
        a first motor capable of normal and reverse rotation;
        a second motor capable of normal and reverse rotation and spaced apart from the first motor;
        a plurality of pulleys coupled to rotating shafts of the first and second motors, respectively;
        a frame;
        a moving arm including a mount slidably mounted on the frame;
        a carriage mounted on the moving arm such that the carriage is slidable in the Y-axis direction perpendicular to a slide direction, which is the X-axis direction, of the moving arm, wherein the extruder is installed at the carriage;
        a belt wrapped around the pulleys and connected to the carriage; and
        a plurality of idlers that guide the belt,
    wherein the lifter includes:
        a lifting motor provided between the first motor and the second motor with respect to the X-axis direction;
        a screw extending downward from the lifting motor;
        a lifting gear engaged with the screw to vertically move along the screw and coupled to the base;
        at least one pair of vertical rods extending in the vertical direction wherein upper ends of the vertical rods are coupled to the frame;
        lifting guides that vertically move along the pair of vertical rods and coupled to the base; and
        a motor mount installed at an upper portion of the vertical rods and vertically spaced apart from the frame and positioned below the frame,
    wherein the at least one pair of vertical rods includes:
        a first vertical rod provided between the screw and the first motor with respect to the X-axis direction; and a second vertical rod provided between the screw and the second motor with respect to the X-axis direction, wherein the lifting motor is installed at the motor mount and provided between the frame and the motor mount, wherein the motor mount limits an upward movement of the lifting guides by a distance equal to a distance that the motor mount is spaced apart from the frame.

2. The three-dimensional printer according to claim 1, wherein the plurality of idlers comprises:

a pair of first idlers installed at the mount so as to turn the belt perpendicularly;

a pair of second idlers installed at the mount to be spaced apart from the pair of first idlers so as to turn the belt perpendicularly;

a pair of third idlers installed at a position on the moving arm opposite the pair of first idlers so as to turn the belt in the opposite direction; and a fourth idler installed at the carriage so as to turn the belt in the opposite direction.

3. The three-dimensional printer according to claim 2, wherein the belt is connected at one end thereof to the carriage and is wrapped around one of the pair of third idlers, one of the pair of second idlers, one of the pulleys, one of the pair of first idlers, and the fourth idler in order.

4. The three-dimensional printer according to claim 1, further comprising a control unit for controlling the first and second motors, wherein the control unit controls the first and second motors to be concurrently driven, or controls one of the first and second motors to be driven while controlling the other to be stopped.

5. The three-dimensional printer according to claim 1, wherein the rotating shafts of the first and second motors rotate in directions opposite to each other to advance or retreat the carriage.

6. The three-dimensional printer according to claim 1, wherein the rotating shafts of the first and second motors rotate in the same direction to advance or retreat the moving arm.

7. The three-dimensional printer according to claim 1, wherein, when one of the first and second motors is operated while the other is stopped, the moving arm and the carriage linearly move to move the carriage in an inclined direction.

8. The three-dimensional printer according to claim 1, wherein the pair of vertical rods are laterally spaced apart from each other with the screw provided therebetween.

9. The three-dimensional printer according to claim 1, further including a connecting bracket connecting the extruder to the carriage.

10. The three-dimensional printer according to claim 9, wherein the connecting bracket includes:

an upper plate fixed to an upper surface of the carriage;

a lower plate positioned below the moving arm and on which the extruder is mounted; and connecting plates connecting the upper plate to the lower plate.

11. The three-dimensional printer according to claim 1, wherein the robot system further includes a motor holder positioned above the frame and on which the first motor and the second motor are mounted.

12. The three-dimensional printer according to claim 1, further including a case including a cavity defined therein, wherein the cavity is a space in which a three-dimensional object is formed.

13. The three-dimensional printer according to claim 12, wherein the robot system is installed in the case.

14. The three-dimensional printer according to claim 12, further including one or more frame holders mounted on the frame and fixed to the case.

15. The three-dimensional printer according to claim 14, wherein the one or more frame holders include a first holder which is mounted on a first side of the frame, and a second holder which is mounted on a second side of the frame.

* * * * *